J. P. SMITHERS, DEC'D.
H. & W. SMITHERS, EXECUTORS.
AUTOMATIC STARTING DEVICE FOR EXPLOSIVE ENGINES.
APPLICATION FILED JAN. 28, 1909. RENEWED NOV. 6, 1911.
1,066,424.
Patented July 1, 1913.
3 SHEETS—SHEET 1.
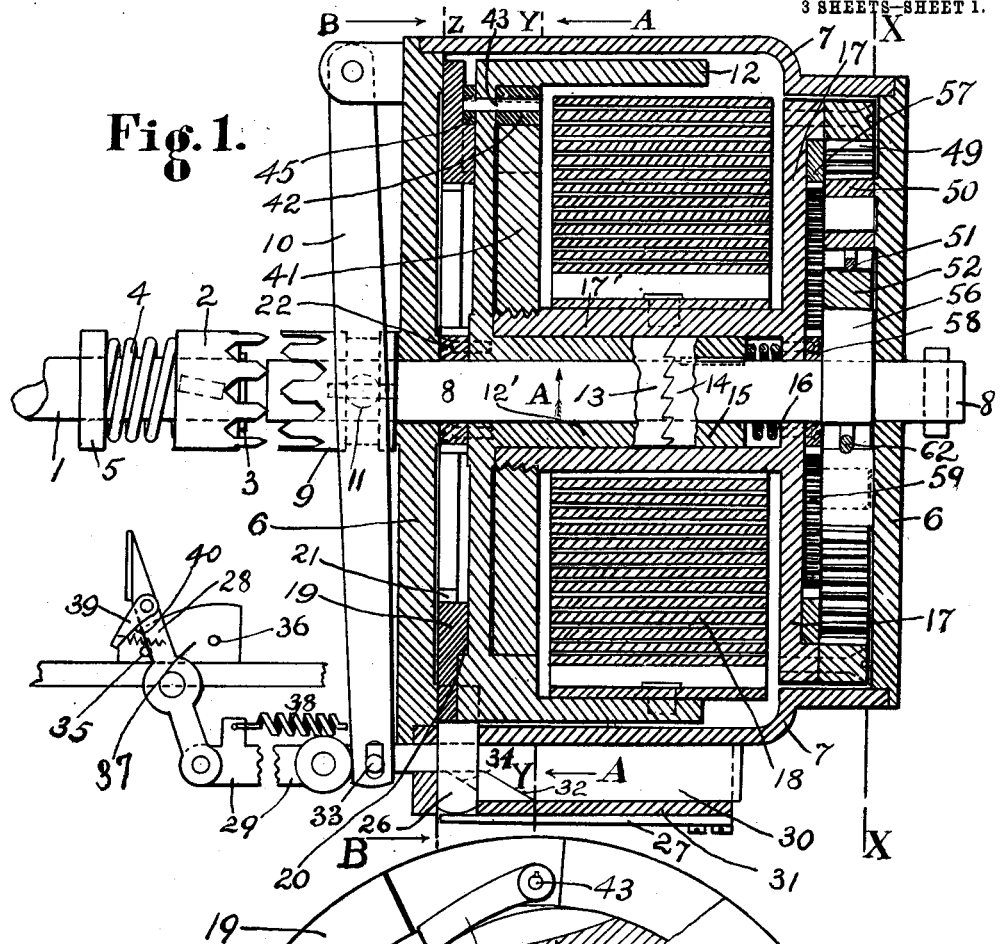
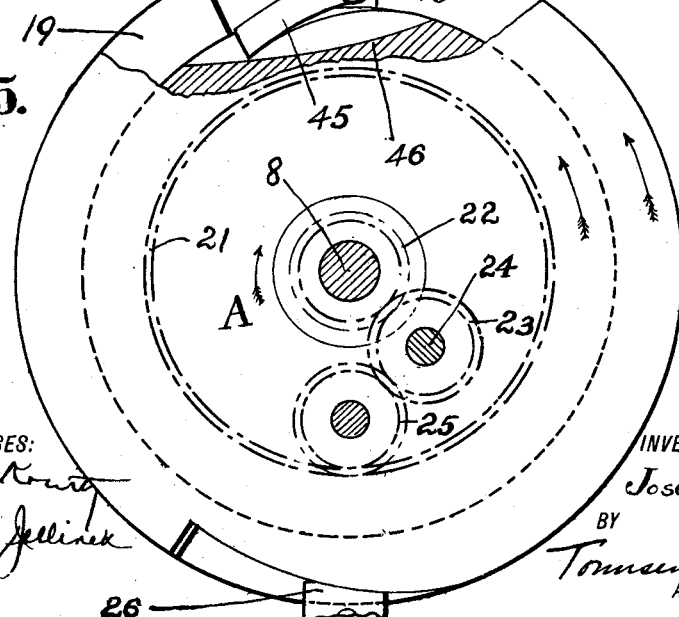

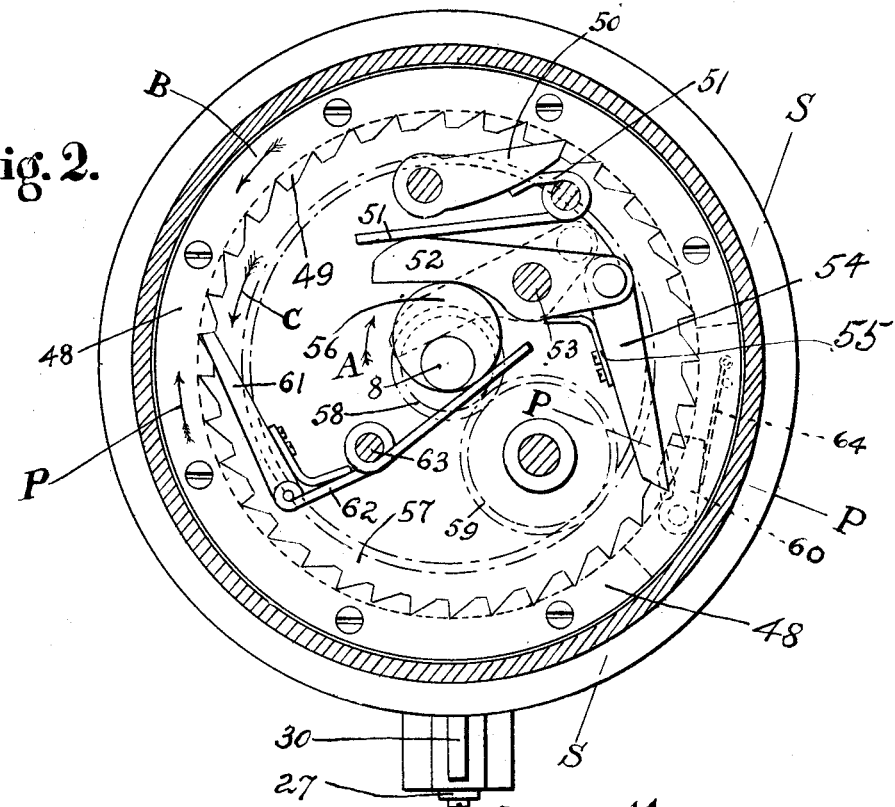
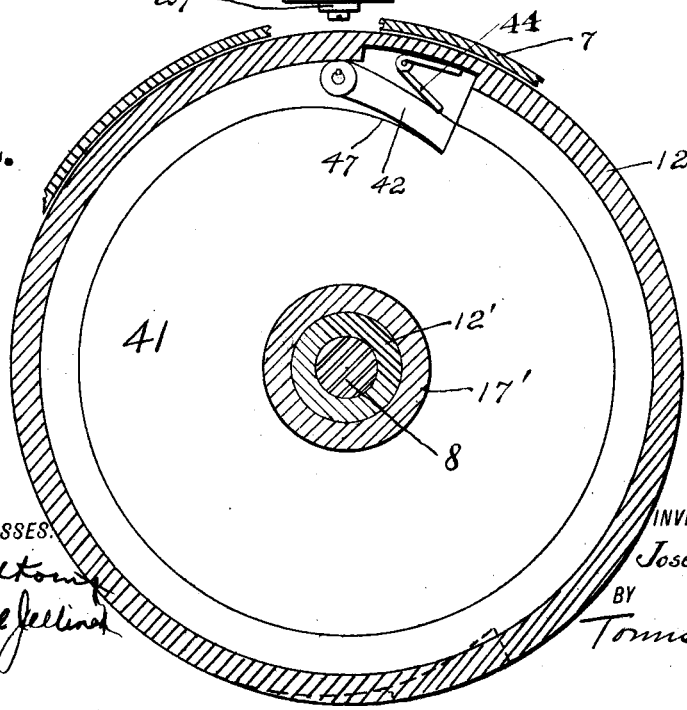

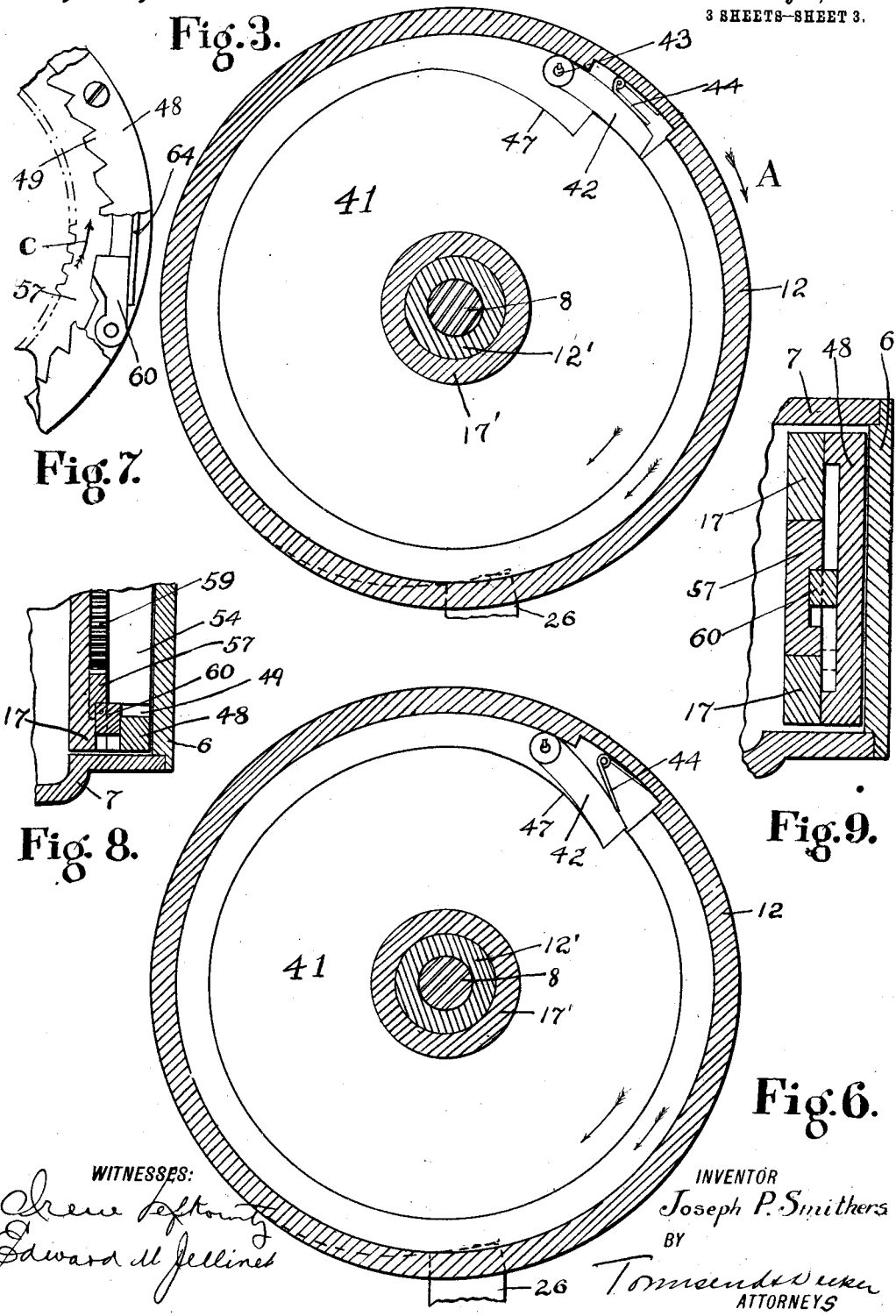

ced certain new and useful Improvements in
UNITED STATES PATENT OFFICE.

JOSEPH P. SMITHERS, OF BROOKLYN, NEW YORK; HERBERT SMITHERS AND WALTER SMITHERS EXECUTORS OF SAID JOSEPH P. SMITHERS, DECEASED.

AUTOMATIC STARTING DEVICE FOR EXPLOSIVE-ENGINES.

1,066,424. Specification of Letters Patent. Patented July 1, 1913.

Application filed January 28, 1909, Serial No. 474,762. Renewed November 6, 1911. Serial No. 658,875.

*To all whom it may concern:*

Be it known that I, JOSEPH P. SMITHERS, a subject of the King of Great Britain, and a resident of Brooklyn, in the county of Kings and State of New York, have invented certain new and useful Improvements in Automatic Starting Devices for Explosive-Engines, of which the following is a specification.

My present invention relates to automatic starting devices for internal combustion engines and has for its main object to provide means for starting explosive engines operated by gas, gasolene or the like without the necessity of "cranking" or turning the engine over by hand in order to cause the engine to take up and run under its own power.

A further object is to provide means whereby the spring, which actuates the crank-shaft, will unwind a number of turns to rotate the said shaft a number of revolutions and to eliminate gearing between the spring and the shaft to be driven.

A still further object is to provide winding mechanism which will be brought into operation to wind the spring by the engine shaft when revolving under its own power without any sudden jar or strain on the parts.

A further object is to reduce the number of parts and to simplify and cheapen the cost of construction of devices of this character.

To these ends my invention consists in the novel means for permitting the spring to unwind a number of turns as hereinafter more particularly described and then specified in the claims.

My invention consists still further in the details of construction and combinations of parts hereinafter more particularly described and then specified in the claims.

In the accompanying drawings, Figure 1 illustrates a general vertical section and partial elevation of a device constructed in accordance with my invention. Fig. 2 is a transverse section on the line X X Fig. 1 and illustrates the winding mechanism. Fig. 3 is a transverse section on the line Y Y Fig. 1 looking in the direction of the arrow A and shows the position of the various parts when the spring is fully wound. Fig. 4 is a similar view of the same parts showing the position thereof when the spring is unwound. Fig. 5 is a transverse section on the line Z Z Fig. 1 looking in the direction of the arrow B and illustrates the same position of the parts as is shown in Fig. 4, that is, when the spring has unwound. Fig. 6 is a similar view to Fig. 3 showing the position of the parts when the winding mechanism starts to re-wind the spring. Fig. 7 is a detached view of a detail. Fig. 8 is a section on the line P P Fig. 2. Fig. 9 is a section on the line S S Fig. 2.

1 indicates the crank shaft of an internal combustion engine such as used in automobiles, motor boats and the like and is provided with a clutch member 2 mounted thereon. The clutch member 2 is preferably free to slide in a longitudinal direction on the shaft 1 but is keyed to said shaft to prevent independent rotation. The clutch member 2 is normally held against a collar 3 secured to the end of the shaft 1 by a spring 4 compressed between a collar 5 fixed on the shaft and the clutch member 2.

In the preferred form of carrying out my invention, I employ a casing which surrounds and protects the various operating parts of the device. The said casing consists of front and back plates or covers 6 and side walls 7 secured to the front and back covers. A shaft 8 journaled in bearings in the front and back plates of the casing is preferably in line with the crank shaft 1 but obviously might be otherwise located as convenience might dictate. Said shaft 8 is provided at one end with a clutch member 9 keyed to the shaft 8 but free to slide longitudinally thereon to coöperate with the clutch member 2 to couple the shaft 8 to the crank shaft 1.

10 indicates a lever pivotally mounted on the back plate 6 and provided with laterally projecting pins 11 which enter an annular groove in the clutch member 9 and cause said clutch member to be coupled with or uncoupled from its coöperating member 2 in a manner to be presently described. Obviously any suitable form of engaging surfaces might be employed on the clutch members without departing from the spirit of my invention.

12 indicates a drum provided with an elongated hub 12' loosely mounted on the shaft 8. The hub 12' of said drum is provided with ratchet teeth 13 annularly arranged on the end of said hub. Said ratchet teeth are normally engaged by co-acting teeth 14 formed on the end of a sleeve 15. The said sleeve is keyed to the shaft 8 but free to move longitudinally thereon, the teeth of the hub 12' and the sleeve 15 being pressed into engagement with each other by a spring 16. When the drum 12 and hub 12' rotates in the direction of the arrow A it will be obvious that the ratchet teeth will cause the shaft 8 to be rotated through the feather connection of the sleeve 15 but if the drum 12 is held and the shaft 8 is rotating in the direction of the arrow, the teeth 14 of the sleeve will merely slip over the teeth 13, the spring 16 being compressed by said slipping movement and the rotation of the shaft will not affect the drum 12. Obviously, if desired, other suitable forms of automatically coupling and uncoupling the drum 12 with the shaft 8 might be employed.

17 indicates a disk provided with an elongated hub 17' and loosely mounted on the outer periphery of the hub 12' so that the disk 17 and hub 17' can rotate or be held stationary independent of the movement of the drum 12 and hub 12'.

18 indicates a coiled spring secured at its outer end to the drum 12 and at its inner end to the hub 17' of the disk 17, said spring being normally held under tension so that upon releasing it, it will unwind from its outer end, the inner end being held as will hereinafter be described, causing the drum 12, hereinafter called the unwinding drum, to rotate the shaft 8 in the direction of the arrow A by means of the ratchets 13, 14 and sleeve 15. When the spring has unwound and the unwinding drum 12 is held, rotation given to the disk 17, hereinafter called the winding disk, will cause the spring to be wound up from its inner end.

19 indicates a ring provided with an annular shoulder 20 which rides loosely on a suitable annular seat formed on the unwinding drum 12. The ring 19 is provided with an internal gear 21 and is rotated by means of a pinion 22 secured to the drum 12, so as to rotate when said drum rotates, it being geared to said internal gear by an idler 23, mounted on a stud 24 secured to the back plate 6, and a pinion 25, also mounted on a stud from the back plate, said gearing being shown more clearly in Fig. 5. The relation between the pinion 22 and gear 21 12, the ring 19 will make one complete revolutions of the pinion 22 or unwinding drum 12, the ring 19 will make on complete revolution. Also by employing the idler 23 the ring 19 rotates in the same direction as the drum 12.

The spring 18 is normally held from unwinding by a pin 26 engaging the drum 12 and ring 19 in a recess formed in the peripheries thereof. The pin 26 passes through an opening in the fixed walls 7 of the casing and is forced against the edge of the drum by a spring 27.

28 indicates a lever, preferably in the form of a foot-pedal, pivotally mounted at some convenient location and to which is pivoted a link 29.

30 indicates a tongue mounted in a suitable guide 31, said tongue being of reduced cross-section for a portion of its length, the reduced section joining with the larger section by an inclined surface 32. The reduced part of the tongue 30 passes through a suitable opening in the pin 26 and is pivotally secured to the end of the link 29. The free end of the clutch operating lever 10 is suitably secured to the tongue 30 as at 33 so that upon forcing the lever 28 over the clutch member 9 is first forced into engagement with the clutch member 2 and upon further movement of the lever 28 the inclined surface 32 of the tongue 30 strikes a similar surface 34 formed in the pin 26 and withdraws said pin from its engagement with the drum 12 and permits the spring to unwind. The lever 28 reciprocates between stops 35 and 36 secured to a segment 37 and so arranged that when the lever 28 strikes the stop 36, the pin 26 has been withdrawn from the recess in the unwinding drum by the tongue 30 and the spring starts to unwind after which the pin rides upon the peripheries of the drum 12 and ring 19. Upon releasing the lever 28 it flies back due to the action of a spring 38 but is prevented from returning to its original position against the stop 35 by a detent 39 which engages a notch 40 in the segment 37. When the lever has come to rest at the notch 40, the pin 26 is released from the action of the tongue 30 and it is free to again enter the recesses in the peripheries of the drum and ring when these recesses again present themselves, but the members of the clutch are still coupled as this return movement of the lever is not sufficient to draw them apart. The object of this construction is to permit the pin to hold the one end of the spring when it can enter the recesses, but still leave the device coupled to the crank-shaft 1 which after it has started to rotate under its own power is utilized to rewind the spring as will be presently described. Upon freeing the detent 39 from the notch 40 which is done after the spring has been re-wound, the lever 28 will return to its position against the stop 35 by which movement the members of the clutch are uncoupled and the crank-shaft continues to rotate under its own power without affecting the device in any way.

The object in permitting the clutch member 2 to move longitudinally is as follows: Should the teeth of the member 9 not come squarely in the spaces between the teeth of the member 2 when they are brought toward the member 2, if the member 2 was rigid the result might be to break off the teeth or to slip or in any event prevent an effective grip between the members. By permitting the member 2 to yield and fastening it to the shaft 1 by a spirally arranged feather, if the teeth do not exactly mesh the member 2 will be rotated and travel on the feather and compress the spring until the teeth are in perfect mesh when the spring will again force the member 2 outward.

41 indicates a disk secured to the hub 17' so that when the winding disk 17 is rotated the disk 41 rotates and when the disk 17 is held the disk 41 is also held, said disk being free to rotate within the unwinding drum 12 and independent of any movement of said drum.

42 indicates a pawl keyed to a rock shaft 43 mounted in the unwinding drum 12, said pawl being located in a suitably formed recess in the drum 12 and pressed against the edge of the disk 41 by a spring 44. The shaft 43 is continued beyond the web of the drum 12 and provided at this end with a pawl 45 of similar shape to and keyed to the rock shaft in the same position as the pawl 42. As will be obvious any movement of one pawl will cause the other pawl to make the same movement. The annular shoulder 20 of the ring 19 is cut away at one portion to form a notch 46 (see Fig. 5) and the disk 41 is provided with a notch 47 in the edge thereof so that when the notch 46 in the ring 19 and the notch 47 in the disk 41 coincide the pawl 42 is forced into the notch 47 by the spring 44. When the spring is wound up and held under tension, the various parts are in the position shown in Fig. 3. Upon releasing the spring, the drum rotates in the direction of the arrow A, the pawl 42 riding on the edge of the disk 41. When the spring has unwound one turn, if the pawl 42 was permitted to drop into notch 47 further unwinding movement of the spring would be stopped as the disk 41 cannot rotate in this direction owing to the fact that the inner end of the spring would rotate it in the opposite direction were it permitted to do so, but it is not, as a positive stop is provided as will be presently described. As previously stated, the ring 19 rotates but once to every four revolutions of the unwinding drum so that when the pawl 42 comes around to the notch 47, it is held out of said notch by the pawl 45 riding on the annular shoulder 20 of the ring 19. This is repeated until such time as the notches 46 and 47 coincide and the pawl 42 is then permitted to enter the notch 47 and stops the unwinding movement of the spring by butting against the shoulder thereof in which position the two ends of the spring are locked together, that is the unwinding drum 12 is locked to the winding disk 17 and a comparatively feeble force will turn the two of them as a unit for purposes to be presently described. Also it will be observed that the pin 26 is similarly prevented from entering the recess in the outer periphery of the unwinding drum by riding on the outer edge of the ring 19 until such times as the two recesses coincide, which in the combination shown will be when the spring has unwound four turns. The position of the various parts when the spring has fully unwound and is prevented from further unwinding is shown in Fig. 4.

Referring more particularly to Fig. 2, 48 indicates a ratchet ring secured to the winding disk 17 and provided with inwardly projecting teeth 49. The spring 18 being secured at its inner end to the disk 17 or to the hub 17' thereof tends to turn the disk 17 and ratchet ring or winding ratchet 48 in the direction of the arrow B but is prevented from so doing by a detent 50 mounted on a stud secured to the front cover plate 3 and pressed against the teeth of said winding ratchet by a spring 51.

If the ratchet ring 48 is rotated in the direction of the arrow P the spring 18 will be wound up by turning the inner end thereof secured to the hub 17'.

52 indicates a lever pivotally mounted on a stud 53 secured to the front plate 6 and has an arm or pawl 54 pivotally mounted on one end. The arm 54 is of approximately the same width as the width of the teeth 49 and engages the said teeth at its free end, the lever 52 and arm 54 forming a bell crank and by means of a reciprocating motion will turn the disk 17 by means of the teeth 49 and wind the spring 18. A spring 55 secured to the arm 54 keeps the free end thereof pressed against the teeth 49 and still permits it to yield when passing over the tops of the teeth.

56 indicates a cam or eccentric secured to or formed on the shaft 8 and which contacts with the free end of the lever 52, the end of said lever being pressed against said eccentric at all times by the spring 51. When the shaft 8 is rotated as in the direction of the arrow A, the rotary motion of the eccentric will be transmitted into a reciprocating motion of the arm 54 and will cause said arm to progressively engage the teeth of the ratchet ring 48 and rotate said ring. However, as the shaft 8 and eccentric 56 rotate when the spring is unwinding, it is essential that the bell crank be rendered inoperative to wind up the spring during its unwindings. This result might be attained in any suitable way and is herein preferably brought about in the following manner: 57 indicates an internal gear wheel loosely mounted between the disk 17 and the teeth 49. The gear wheel 57 is rotated, when the winding drum 17 is rotated, by means of a pinion 58 secured to said drum, and connected to said internal gear by a gear wheel 59 mounted on a stud secured to the front plate 6. A pawl 60 mounted on the ratchet ring 48 in a recess formed therein is adapted to enter a notch formed in the outer periphery of the gear wheel 57 (Fig. 7) and a similar notch formed in the teeth 49 when the two notches coincide and when in this position the pawl fills up part of the space between two of the teeth 49 and as the reciprocating motion given to the arm 54 is only just sufficient to bring it over one tooth to engage the shoulder thereof and as the pawl in this position fills up the space, the arm is prevented from catching the next tooth and merely goes back to the same tooth it started from. By these means, so long as the spring is unwinding the arm 54 is inoperative. To render the pawl inoperative and to bring the bell crank into operation to rotate the ring 48 and disk 17 the following device is employed: When the spring has unwound its desired number of turns and the two ends of the spring are locked together by the pawl 42 as previously described, a comparatively feeble force will rotate the ratchet ring 48, it being secured to the disk 17. 61 indicates a pawl pivotally secured to a stout spring 62, said spring being coiled around a stud 63 and terminating in a free end which presses against the eccentric 56. The rotation of the eccentric will bend the spring 62 and while this spring would not have sufficient strength to move the ratchet ring 48 when it has any work to do, such as winding the spring 18, it is sufficiently strong to turn said ratchet ring when the two ends of the spring 18 are locked together. Thus, when the two ends of the spring are locked together and the shaft 8 is rotating, the pawl 61 moves the ratchet ring 48 through two teeth which then permits the bell crank to engage the teeth 49 as the pawl 60 has been fed past the end of the arm 54 by the movement given to the ratchet ring by the pawl 61. As the winding disk is rotated the internal gear 57 rotates in the reverse direction as indicated by the arrow C and the end of the pawl rides upon the outer periphery of this gear. The spring is then wound up by the bell crank rotating the ratchet ring, tooth by tooth and as the gear ratio of the internal gear is four to one the ratchet ring will have to be rotated four complete revolutions before the notch in the internal gear 57 again coincides with the notch in the teeth 49 and permits the pawl 60 to be forced therein by the spring 64 and the winding ceases. At the time the bell crank starts in operation to turn the ratchet ring, the pin 26 engages the shoulder of the recess in the drum 12 and holds the one end of the spring, this position being shown in Fig. 6.

It will be noted that each time the arm 54 comes in contact with the shoulder on one of the teeth 49 the eccentric 56 is at its dead center preparatory to giving the arm 54 its reverse movement and therefore the coupling of the end of the arm 54 with the teeth 49 is effected without any shock or blow, it being done at a time when practically there is no motion being given to the arm.

The operation of the device is as follows, assuming that the spring has previously been wound up and is held under tension by the pin 26. The operator presses the lever 28 which first couples the clutch members 2 and 9 and then withdraws the pin 26 as previously described. The spring unwinds and rotates the drum 12 which causes the shaft 8 to be rotated by the sleeve 15, the other end of the spring being held by the pawl 50. The spring continues to unwind until the notches 46 and 47 coincide and permit the pawl 42 to spring into the notch 47 and lock the two ends of the spring together as previously described. The shaft 8 is now rotating under its own power and the bell crank reciprocating back and forth but not able to catch a tooth owing to the pawl 60. The two ends of the spring having been locked together, the pawl 61 forces the ratchet ring 48 around a couple of teeth and the bell crank takes up the winding of the spring at which time the pin 26 engages the shoulder on the drum 12 and holds the one end of the spring, the operator having previously released the lever 28 and permitted it to spring back until the detent stops in the notch 40. The winding operation continues until the pawl 60 drops into the notches in the gear 57 and teeth 49 and renders the bell crank inoperative after which the operator frees the detent 39 from the notch 40 and the lever 28 springs back to position against the stop 35 which disengages the clutch members 2 and 9 and the engine continues to run but without affecting any of the parts of the starting device.

What I claim as my invention is:

1. In an automatic starting device for explosive engines, the combination with a shaft, of a spring normally held under tension adapted to rotate said shaft, an unwinding drum secured to one end of said spring, winding mechanism secured to the other end of said spring, means for locking said unwinding drum and said winding mechanism together and means for rendering said locking means inoperative until said unwinding drum has made a predetermined number of revolutions.

2. In an automatic starting device for explosive engines, the combination with a shaft, of a spring normally held under tension adapted to rotate said shaft, an unwinding drum secured to one end of said spring, winding mechanism secured to the other end of said spring, means for locking said unwinding drum and said winding mechanism together and annular means adapted to rotate slower than said unwinding drum and to prevent said locking means from operating.

3. In an automatic starting device for explosive engines, the combination with a shaft, of a spring normally held under tension adapted to rotate said shaft, an unwinding drum secured to one end of said spring, winding mechanism secured to the other end of said spring, a pawl carried by said drum and adapted to lock said drum and said winding mechanism together and means adapted to prevent the operation of said pawl until said drum has rotated a predetermined number of times.

4. In an automatic starting device for explosive engines, the combination with a shaft, of a spring normally held under tension adapted to rotate said shaft, an unwinding drum secured to one end of said spring, winding mechanism secured to the other end of said spring, a pawl carried by said drum and adapted to lock said drum and said winding mechanism together and means controlled by the rotation of said drum for preventing the operation of said pawl until said drum has rotated a predetermined number of times.

5. In an automatic starting device for explosive engines, the combination with a shaft, of a spring normally held under tension adapted to rotate said shaft, an unwinding drum secured to one end of said spring, winding mechanism secured to the other end of said spring, a pawl carried by said drum and adapted to lock said drum and said winding mechanism together and a coacting pawl adapted to control the locking operation of said first named pawl and itself controlled by the rotation of said drum to prevent said first named pawl from operating until said drum has made a predetermined number of revolutions.

6. In an automatic starting device for explosive engines, the combination with the engine shaft, of an auxiliary shaft normally free from said engine shaft, a clutch member mounted on said engine shaft, a coöperating clutch member mounted on said auxiliary shaft, means for coupling said clutch members and means whereby one of said members is permitted to yield and rotate should the two members be prevented from meshing with each other.

7. In an automatic starting device for explosive engines, the combination with a shaft, of a spring normally held under tension adapted to rotate said shaft, an unwinding drum secured to one end of said spring, a winding disk secured to the other end of said spring, means for locking said unwinding drum and said winding disk together, a ratchet ring secured to said winding disk, a bell crank adapted to engage said ratchet ring and rotate said winding drum, means for rendering said bell crank inoperative when said unwinding disk is rotating, and means for turning said locked disks to bring said bell crank into operation.

8. In an automatic starting device for explosive engines, the combination with a shaft, of a spring normally held under tension, a winding disk secured to one end of said spring, reciprocating means for rotating said winding disk, a pawl for rendering said reciprocating means inoperative when said spring is unwinding, means for freeing said reciprocating means from the action of said pawl and means for rendering said pawl inoperative until said winding disk has been rotated a predetermined number of times.

9. In an automatic starting device for motors, the combination with a shaft, of a spring normally held under tension, a winding disk secured to one end of said spring, reciprocating means for rotating said disk to wind up said spring, an eccentric on said shaft and a spring adapted to keep said reciprocating means in operative position against said eccentric.

10. In an automatic starting device for motors, the combination with a shaft, of a spring normally held under tension adapted to rotate said shaft, and reciprocating means for rewinding said spring by a step by step movement, said reciprocating means being actuated by the rotation of said shaft, and thrown into and out of action by means independent of said spring.

11. In an automatic starting device for motors, the combination with a shaft, of a spring normally held under tension adapted to rotate said shaft, a reciprocating lever adapted to rewind said spring, and actuated by the rotation of said shaft, and thrown into and out of action by means independent of said spring.

12. In an automatic device for starting motors, the combination with a shaft, of a spring normally held under tension, a winding disk secured to one end of said spring, reciprocating means for rotating said disk to wind said spring, an eccentric on said shaft adapted to actuate said reciprocating means, and independent means for throwing it into and out of operation.

13. In an automatic starting device for explosive engines, the combination with a shaft, of a spring normally held under tension, a winding disk secured to one end of said spring, means for converting the rotary motion of said shaft, into a reciprocating motion, to rotate said winding disk, and independent means for throwing it into and out of action.

14. In an automatic starting device for explosive engines, the combination with a shaft, of a spring normally held under tension, a winding disk secured to said spring, reciprocating means for rotating said disk, independently thrown into and out of action, and actuated by the rotary motion of said shaft, and means for coupling said reciprocating means to said winding disk when said rotary motion is at its dead center.

15. In an automatic starting device for explosive engines, the combination with a shaft, of a spring normally held under tension, a winding disk secured to said spring, reciprocating means for rotating said winding means, independently thrown into and out of action, an eccentric secured to said shaft, adapted to actuate said reciprocating means, and means for coupling said reciprocating means to said winding disk, when said eccentric is at its dead center.

16. In an automatic starting device for explosive engines, the combination with a shaft, of a spring normally held under tension, adapted to rotate said shaft when unwinding, a winding disk secured to said spring, a lever and pawl operated by the rotation of said shaft, for rotating said winding disk, and means independently thrown into action, for rendering said pawl ineffective when said spring is unwinding.

17. In an automatic starting device for explosive engines, the combination with a shaft, of a spring normally held under tension, adapted to rotate said shaft when unwinding, a winding disk secured to said spring, a lever and pawl operated by the rotation of said shaft for rotating said winding disk, independent means for rendering said pawl ineffective when said spring is unwinding, and independent means adapted to bring said pawl into operation after said spring has ceased unwinding.

18. In an automatic starting device for explosive engines, the combination with a shaft, of a spring normally held under tension, a winding disk secured to one end of said spring, reciprocating means for rotating said winding disk, independent means for rendering said reciprocating means inoperative when said spring is unwinding, independent means for causing said reciprocating means to rotate said winding disk, after said spring has unwound, and means adapted to permit said winding disk to be rotated a predetermined number of times by said reciprocating means.

19. In an automatic starting device for explosive engines, the combination with a shaft, of a spring normally held under tension, a winding disk secured to one end of said spring, reciprocating means for rotating said winding disk, independent means for rendering said reciprocating means inoperative, when said spring is fully wound, and independent means for bringing said reciprocating means into operation after said spring has unwound.

20. In an automatic starting device for explosive engines, the combination with a shaft, of a spring normally held under tension, a winding disk, secured to one end of said spring, reciprocating means actuated by the rotation of said shaft and adapted to rotate said winding disk, a pawl for rendering said reciprocating means inoperative when said spring is fully wound and means for rendering said pawl inoperative after said spring has unwound.

21. In an automatic starting device for explosive engines, the combination with a shaft, of a spring normally held under tension, a winding disk secured to one end of said spring, reciprocating means actuated by the rotation of said shaft and adapted to rotate said winding disk, a pawl for rendering said reciprocating means inoperative when said spring is fully wound and means for rendering said pawl inoperative after said spring has unwound, and retaining it in inoperative position until said spring is fully wound.

22. In an automatic starting device for explosive engines, the combination with a shaft, of a spring normally held under tension, a winding disk provided with teeth secured to one end of said spring, reciprocating means actuated by the rotation of said shaft and adapted to progressively engage the teeth of said winding disk, a pawl adapted to prevent said reciprocating means engaging said winding disk when said spring is fully wound, and means for withdrawing said pawl to permit said reciprocating means to engage the teeth of the winding disk after said spring has unwound.

23. In an automatic starting device for motors, the combination with a shaft, of a spring normally held under tension adapted to rotate said shaft, reciprocating means for winding said spring, means for stopping the winding action when the spring has received a predetermined number of turns, means for locking the winding and unwinding ends of the spring after it is unwound and means for turning the spring as a whole, into a position to start rewinding.

24. In an automatic starting device for motors, the combination with a shaft of a spring normally held under tension adapted to rotate said shaft, reciprocating means actuated by an eccentric on said shaft for winding said spring, means for stopping the winding action when the spring has received a predetermined winding, means for locking the winding and unwinding ends of the spring after it has unwound to the desired extent and means for turning the spring as a whole, into a position to start rewinding.

25. In an automatic starting device for explosive engines, the combination with a shaft of a spring normally held under tension, a winding disk secured to one end of said spring, means for converting the rotary motion of said shaft into a reciprocating motion to rotate said winding disk, means for stopping the rotation of said disk when it has made a predetermined number of revolutions, means for preventing backward movement of said disk, means for locking the winding and unwinding ends of the spring after it has unwound, thereby neutralizing its external tension, and means for turning the spring as a whole, and its winding disk into position to start rewinding.

26. In an automatic starting device for motors, the combination with a shaft of a spring normally held under tension, a winding disk secured to one end of said spring, annular means adapted to rotate slower than said winding disk and means controlled by said annular means for stopping the revolution of said winding disk after it has rotated a predetermined number of times.

Signed at New York in the county of New York and State of New York this 27th day of January A. D. 1909.

JOSEPH P. SMITHERS.

Witnesses:
 IRENE LEFKOWITZ,
 EDWARD M. JELIRET.

---

Copies of this patent may be obtained for five cents each, by addressing the "Commissioner of Patents, Washington, D. C."